United States Patent [19]
Takano

[11] Patent Number: 6,094,732
[45] Date of Patent: Jul. 25, 2000

[54] SHARED MEMORY CONTROLLER HAVING AN ADDRESS ERROR DETECTOR

[75] Inventor: Hiroaki Takano, Tokyo, Japan

[73] Assignee: Oki Electric Industry Co., Ltd., Tokyo, Japan

[21] Appl. No.: 09/040,535

[22] Filed: Mar. 18, 1998

[30] Foreign Application Priority Data

Mar. 21, 1997 [JP] Japan .................................. 9-067758

[51] Int. Cl.[7] .................................................. H02H 3/05
[52] U.S. Cl. ........................ 714/53; 711/110; 711/217; 711/218; 711/219; 711/221; 370/392
[58] Field of Search ................................ 714/49, 53, 51, 714/54; 711/110, 149, 173, 217, 218, 219, 221; 370/392, 395

[56] References Cited

U.S. PATENT DOCUMENTS

| | | | |
|---|---|---|---|
| 4,320,466 | 3/1982 | Myers | 711/217 |
| 5,513,318 | 4/1996 | Goor et al. | 714/48 |
| 5,530,806 | 6/1996 | Condon et al. | 714/49 |
| 5,586,253 | 12/1996 | Green et al. | 714/53 |
| 5,742,600 | 4/1998 | Nishihara | 370/395 |
| 5,790,782 | 8/1998 | Martinez et al. | 714/53 |
| 5,870,394 | 2/1999 | Oprea | 370/392 |
| 5,893,162 | 4/1999 | Lau et al. | 711/153 |

*Primary Examiner*—Do Hyun Yoo
*Assistant Examiner*—Hiep T. Nguyen
*Attorney, Agent, or Firm*—Rabin & Champagne, P.C.

[57] ABSTRACT

A shared memory controller prevents a memory area in a shared memory from becoming unusable even if an error occurs in an address for performing read/write operations. Under the control of a write control unit, each time N units of data and an address indicative of a storage location next to this data is written into the shared memory, one of the written addresses is stored in a second memory provided separately from the shared memory. Each time N addresses are read from the shared memory, an address stored in the second memory is read to detect in a detector whether or not the address is erroneous. If an error is detected, the erroneous address is discarded.

2 Claims, 4 Drawing Sheets

SHARED MEMORY CONTROLLER HAVING AN ADDRESS ERROR DETECTOR

BACKGROUND OF THE INVENTION

1. Field of the Invention

The present invention relates to a shared memory controller for controlling a memory shared by a plurality of data groups, to write data into and read data from the shared memory.

2. Description of Related Art

Shared memory schemes are often employed to separately store a plurality of data groups. Here, the term "shared memory scheme" refers to a scheme which is adapted to one or a plurality of physically provided memories to manage addresses of data for each data group to logically organize a plurality of memories. According to this scheme, the memory utilization efficiency can be improved.

The shared memory schemes may be generally classified into two schemes. The first scheme is a so-called linked address scheme which treats a combination of data to be stored and an address indicative of a data storage area for data to be stored next to that data as one unit, and stores this combination into a shared memory. The second scheme writes only data into a shared memory and stores the addresses, at which the data are stored, in an individual fixed-length queue (a fixed memory for addresses) provided separately from the shared memory.

In the following, memory error preventive measures will be described for the scheme which stores addresses in a separate fixed-length queue.

As mentioned above, the shared memory scheme inputs addresses to a memory as well for management. Specifically, as data is input to a shared memory, an address is retrieved from an empty-address memory which stores unused addresses such that the data is written into a storage area of the shared memory indicated by this address, and the address is simultaneously written into an associated queue (FIFO type) within the separate fixed address memory for management. Here, the empty-address memory is previously loaded with addresses available to the shared memory.

The reading of data is performed by reading an address from an address queue associated with the data to be read, and reading data from the shared memory using this address. Simultaneously, the address is written into the fixed empty-address memory. In other words, the shared memory scheme circulates the address values between the empty-address memory and the fixed address memory provided corresponding to a plurality of queues.

Assume herein that an address in an address queue, held in the fixed address memory, is corrupted due to, for example, a memory error or the like. In this event, the value of the address will change to another address value, and this corrupted address value circulates between the empty-address memory and the fixed address memory. This causes the same address to be stored in the fixed address memory a plurality of times as an element in different address queues, leading to a further data loss due to any of several reasons such as overwriting of data. In addition, since this phenomenon will recur, appropriate measures should be taken.

Conventionally, certain measures to address the problem mentioned above have been taken in a manner described below. First, each address queue is provided with information indicative of in which address queue an address value is stored, and this information is compared with information when the address is actually read from an associated address queue.

If the comparison shows that the same address value is stored in different address queues, it can be known that the first read address was read from an address queue different from the one indicated by this information. In this event, the address is discarded to make unique the address data having the same address value.

The conventional method of controlling a shared memory mentioned above can be applied to a scheme with separate queues for storing addresses. However, this method cannot be applied to the shared memory scheme (so-called linked address scheme) which stores a combination of an address and data as one unit into a shared memory to achieve a higher memory utilization efficiency.

In the linked address scheme, when data is read, an address indicative of a storage location for the next data is also read. If a memory error occurs in this address value, it is impossible to find a write location for the next data. In this event, addresses stored in an address queue corresponding to the address suffering from the memory error are all lost.

The address queue herein used refers to a queue which is logically organized within the shared memory. While a shorter address queue would lose a smaller amount of addresses even if a memory error occurs therein, more addresses would be lost if a longer address queue suffers from a memory error. In the latter case, a larger storage area would become unavailable, and the memory would fail to function effectively.

Thus, there is a need for a shared memory controller which is capable of maximally preventing a storage area of a shared memory from becoming unavailable even if an address error occurs during a write/read operation.

SUMMARY OF THE INVENTION

To solve the problem mentioned above, a shared memory controller according to the present invention comprises (1) a first memory for storing addresses of the shared memory in which no data are stored, (2) a second memory for storing addresses, (3) write control means for performing a first control for writing a combination of data and an address X1 read from the first memory as storage unit data into the shared memory in accordance with a first write address X2 and designating the address X1 read from the first memory as a next write address X3, and a second control for writing the first write address X2 into the second memory, every time the first control is performed N times (where N is a natural number equal to or larger than 2), in addition to the first control, (4) read control means for performing a third control for reading storage unit data from the shared memory in accordance with a first read address Y1, designating an address in the storage unit data as a next read address Y2, and storing the first read address Y1 in the first memory, and a fourth control for executing the third control using an address Y3 read from the second memory in place of the first read address Y1 every time the third control is performed N times, and (5) detecting means for detecting an error in the first read address Y1 or the next read address Y2 and, when detecting an error, discarding the erroneous address and entering into a standby state where the read control means performs the fourth control.

According to the configuration as described above, each time N (for example, 10) addresses are written together with data into the shared memory, one address is stored in the second memory provided separately from the shared memory, and each time N addresses are read from the shared memory, an address stored in the second memory is read to detect whether or not the address is erroneous, so that the amount of addresses lost by a memory error, if any, can be limited to N at most.

DESCRIPTION OF THE PREFERRED EMBODIMENTS

Figure 1:
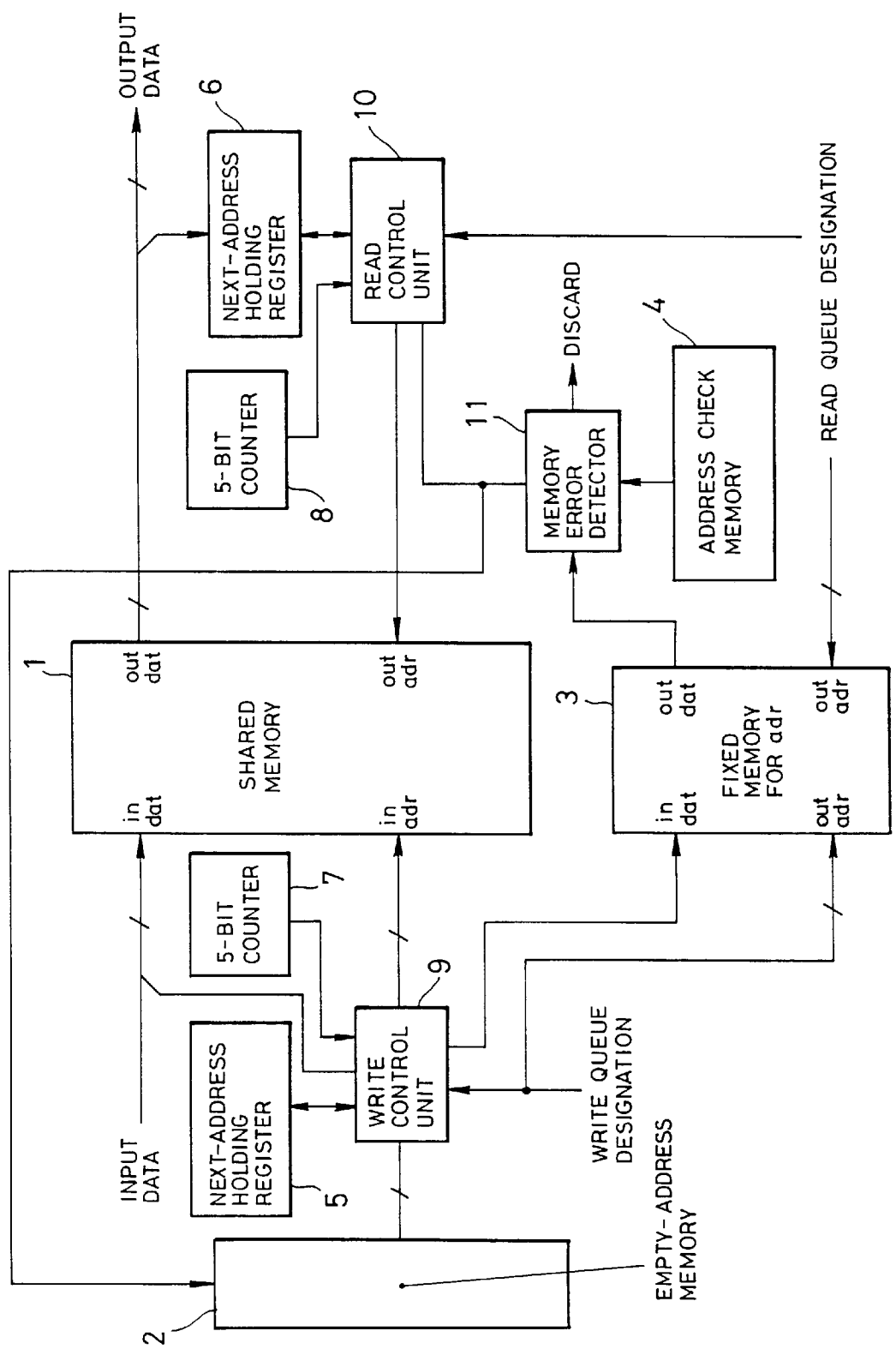
FIG. 1 is a block diagram illustrating the configuration of a shared memory controller according to one embodiment of the present invention.

The present invention will hereinafter be described in connection with an embodiment with reference to the accompanying drawings. FIG. 1 is a block diagram illustrating the configuration of a shared memory controller according to this embodiment.

Referring specifically to FIG. 1, the shared memory controller of this embodiment comprises an empty-address memory 2, a fixed address memory (labelled "fixed memory for adr" in the drawing) 3, an address check memory 4, next-address holding registers 5, 6, 5-bit circular counters 7, 8, a write control unit 9, a read control unit 10, and a memory error detector 11, and is adapted to control a shared memory 1.

Figure 2:
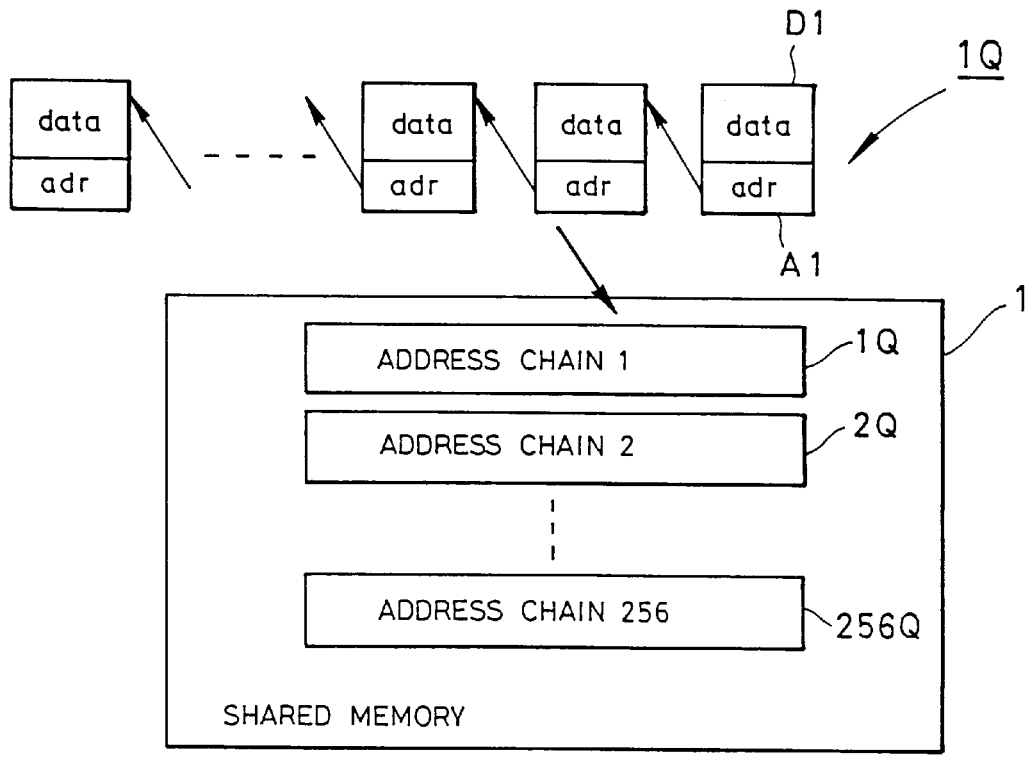
FIG. 2 is a diagram conceptually illustrating the inside of a shared memory in the embodiment.

The shared memory 1 is configured to store a combination of data to be stored in the shared memory 1 and an address indicative of a storage area for data to be stored next to that data as one unit. FIG. 2 conceptually illustrates how data and addresses are stored in this shared memory 1. In this example, the shared memory 1 has a capacity to store 256 sets of data groups. In other words, the shared memory 1 can store 256 queues (address chains) 1Q–256Q. One queue (for example 1Q) is composed of a multiplicity of storage units, each comprising a unit of data D1 and an address A1, which are connected as if they form a chain.

The empty-address memory 2 holds addresses of the shared memory 1 which are not loaded with data. An empty address from the read control unit 10 or the memory error detector 11 is written into the empty-address memory 2, and read therefrom by the write control unit 9.

Figure 3:
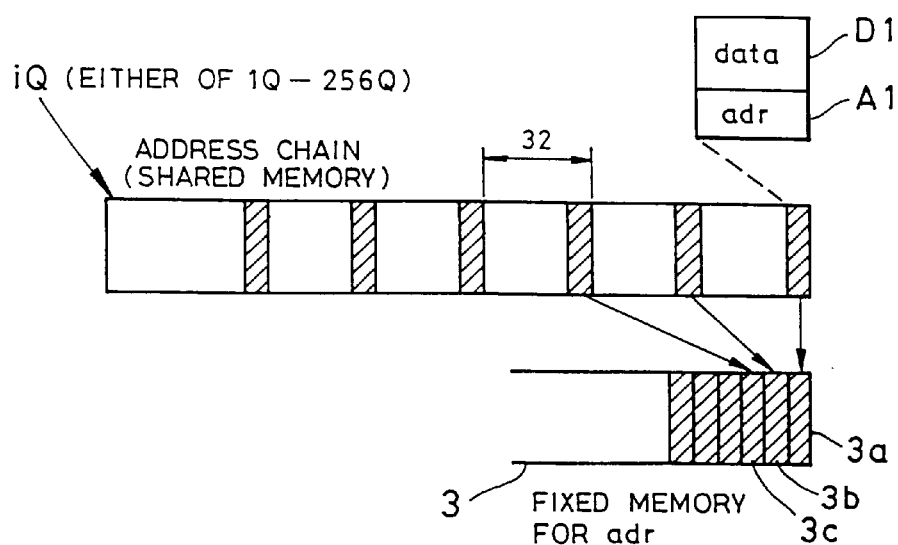
FIG. 3 is a diagram conceptually illustrating a corresponding relationship between an address chain and a fixed address memory in the embodiment.

The fixed address memory 3 stores a next address in one storage unit of the shared memory 1 only when the counter 7 indicates a count value "0". FIG. 3 conceptually illustrates how addresses and data are stored in the fixed address memory 3. As illustrated in FIG. 3, for an address chain iQ (i=1–256) composed of addresses in the shared memory 1, an address A1 of one unit is written into the fixed address memory 3 for every 32 units, as indicated by references 3a, 3b, 3c.

Each of the counters 7, 8 circularly counts from "0" to "31", where the counter 7 is incremented by one as data is written into the shared memory 1, while the counter 8 is incremented by one as data is read from the shared memory 1.

The write control unit 9 is responsive to a write request (designation of a write queue), when issued, to write one unit of address X read from the empty-address memory 2 and data into the shared memory 1 in accordance with an address held by the next-address holding register 5, and to simultaneously store the address X in the next-address holding register 5, when the counter 7 shows a count value other than "0".

On the other hand, when the counter 7 shows a count value equal to "0", the write control unit 9 writes the address Y held in the next-address holding register 5 into the fixed address memory 3, writes one unit of address X read from the empty-address memory 2 and data into the shared memory 1 in accordance with the address Y, and simultaneously registers the address X in the next-address holding register 5.

The read control unit 10 is responsive to a read request (designation of a read queue), when issued, to read one unit of data from the shared memory 1 using an address Y read from the next-address holding register 6, separate the address in the read unit from the data, stores the address in the next-address holding register 6, and stores the address Y in the empty-address memory 2, when the counter 8 shows a count value other than "0".

On the other hand, when the counter 8 shows a count value equal to "0", the read control unit 10 reads the address Y from the fixed address memory 3, reads one unit of data from the shared memory 1 using the address Y, separates an address Z in the read unit from the data, stores the address Z in the next-address holding register 6, and stores the address Y in the empty-address memory 2.

The address check memory 4 has a check table in which address values are previously stored for checking an address Y read from the fixed address memory 3. Since empty addresses are circulating, address changes in an address chain have a regularity. Thus, address values can be previously defined for collating a change in address value in the fixed address memory 3 which stores one address for every 32 units. Such address values are stored in the address check memory 4.

The memory error detector 11 detects a memory error in an address Y read from the next-address holding register 6 or the fixed address memory 3 by comparing the address Y with the values in the check table. When a memory error is detected, the memory error detector 11 resets the count value of the counter 8 to "0" and discards the erroneous address Y.

Figure 4:
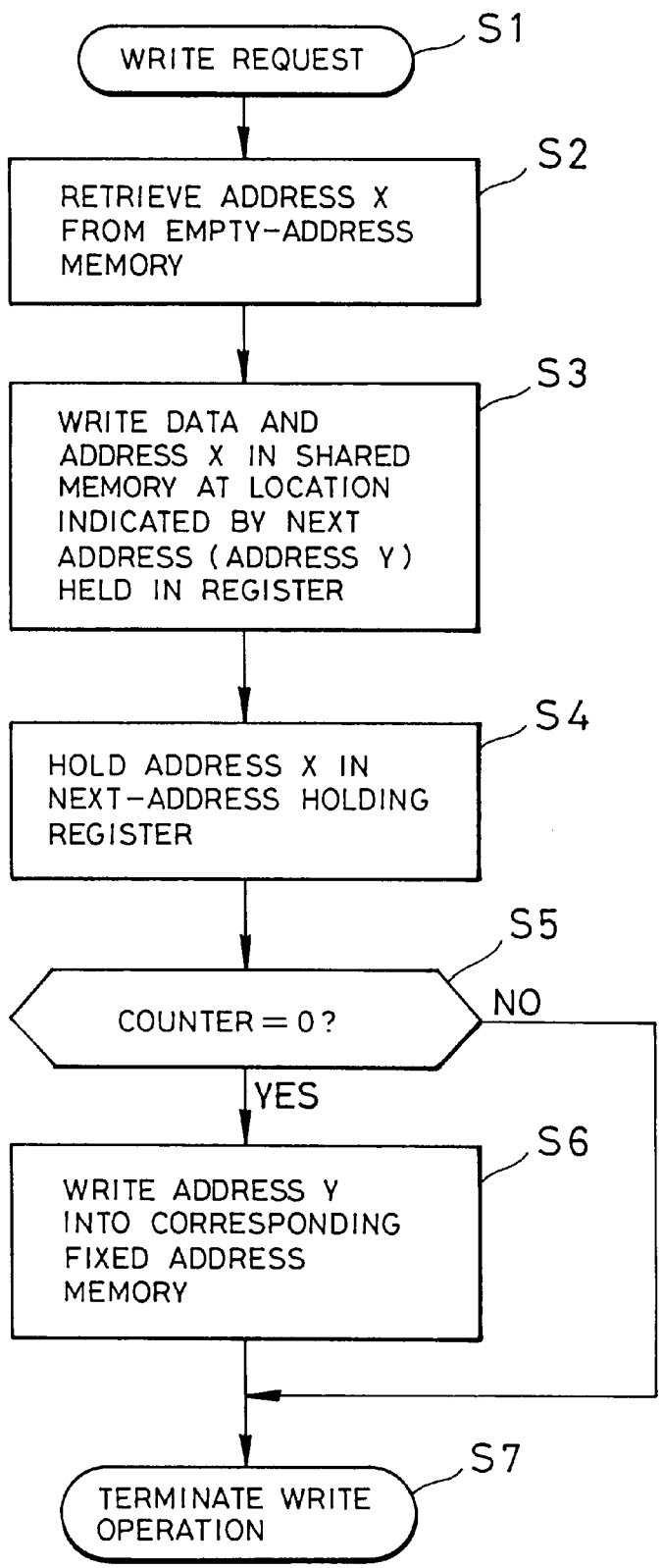
FIG. 4 is an operational flow chart for a write control according to the embodiment of the present invention.
Figure 5:
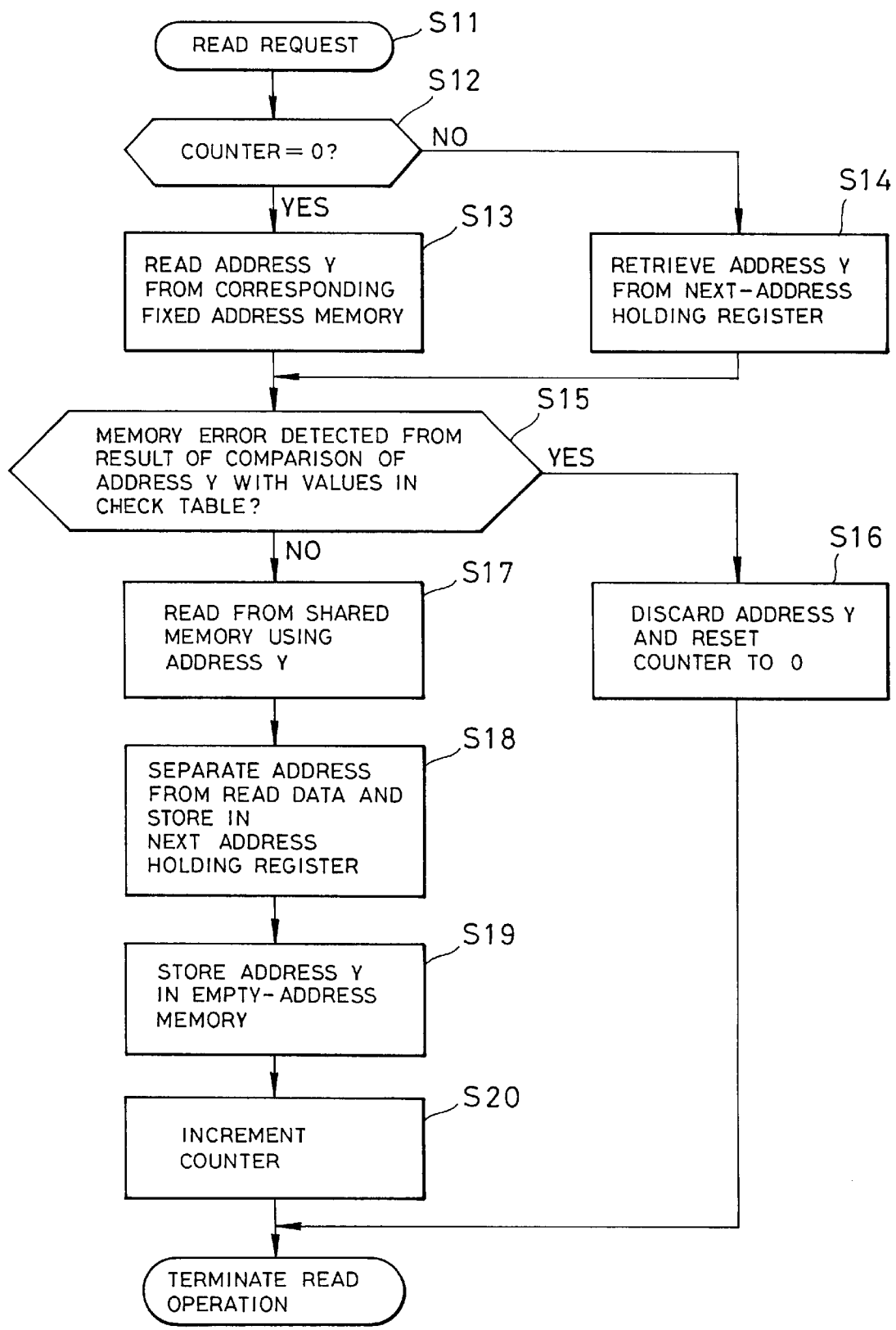
FIG. 5 is an operational flow chart for a read control according to the embodiment of the present invention.

Next, read/write operations of the shared memory controller thus configured will be described with reference to flow charts of FIGS. 4 and 5.

First, a write operation will be described with reference to FIG. 4. Assuming that a write request is issued with designation of a write queue at step S1, the write control unit 9 retrieves an empty address X from the empty-address memory 2 in response to the write queue designation at step S2.

Next, the write control unit 9 writes data and the address X in a storage area of the shared memory 1 indicated by a next address (address Y) held in the next-address holding register 5 at step S3, and stores the address X in the next-address holding register 5 at step S4.

Subsequently, the write control unit 9 determines at step S5 whether or not the count value of the counter 7 is "0".

If a negative result is returned from the determination, i.e., if the count value is not "0", the write operation is terminated at step S7. Conversely, if an affirmative result is returned from the determination, i.e., if the count value is "0", the write control unit 9 writes the address Y in a storage area of the fixed address memory 3 in accordance with the write queue designation at step S6, and subsequently the write operation is terminated at step S7.

Next, a read operation will be described with reference to FIG. 5. Assuming that a read request is issued with designation of a read queue at step S11, the read control unit 10 determines at step S12 whether or not the count value of the counter 8 is "0".

If an affirmative result is returned from the determination, i.e., if the count value is "0", the memory error detector 11 reads an address Y from the fixed address memory 3 corresponding to the read queue designation under the control of the read control unit 10 at step S13. Conversely, if a negative result is returned from the determination, i.e., if the count value is not "0", the read control unit 10 retrieves the next address (address Y) from the next-address holding register 6 and outputs this address to the memory error detector 11 at step S14.

After the processing at steps S13 or S14, the memory error detector 11 compares the address Y with values in the check table in the address check memory 4 at step S15 to determine whether or not the result of the comparison indicates a memory error.

If an affirmative result is returned from this determination, i.e., if a memory error is detected, the memory error detector 11 discards the erroneous address Y, and the read control unit 10 resets the count value of the next-address holding register 6 to "0" at step S16. Subsequently, the read operation is terminated at step S21.

Conversely, if a negative result is returned from the determination at step S15, i.e., if no memory error is detected, the read control unit 10 reads from the shared memory 1 using the address Y at step S17. More specifically, the read control unit 10 reads one unit of data from a storage area of the shared memory 1 in accordance with the address Y.

Next, the read control unit 10 separates an address Z in the one unit data read at step S17, and stores the address Z in the next-address holding register 6 at step S18. Next, at step S19, the read control unit 10 stores the address Y in the empty-address memory 2. Subsequently, the counter 8 is incremented by one at step S20, and the read operation is terminated at step S21.

According to the shared memory controller of the embodiment described above, each time 32 addresses are written together with data into the shared memory 1, one address is stored in the fixed address memory 3 provided separate from the shared memory 1, and each time 32 addresses are read from the shared memory 1, an address stored in the fixed address memory 3 is read to detect in the memory error detector 11 whether or not the address is erroneous, so that the amount of addresses lost by one memory error, if any, can be limited to 32 at most. This allows for an effective utilization of the shared memory 1.

While in the foregoing embodiment, one address for every 32 addresses is stored in the fixed address memory 3, the present invention is not limited to this particular ratio. For example, a 4-bit counter may be used to store one address for every 16 addresses.

Also, while in the foregoing embodiment, the address is checked when it is read from the fixed address memory 3, the address may be additionally checked when it is written into the fixed address memory 3.

According to the shared memory controller of the present invention as described above, the defect inherent in the linked address scheme, to which no measures are available for a memory error, can be alleviated to reduce a loss of addresses due to a memory error in a shared memory. Specifically, one for every 10 addresses, for example, is held in a second memory (fixed memory) to reduce the amount of addresses lost by a memory error to 10 or less, thereby making it possible to effectively utilize the shared memory.

What is claimed is:

1. A shared memory controller for controlling data write/read operations for a shared memory, comprising:

a first memory storing addresses of said shared memory in which no data are stored;

a second memory storing addresses;

a write controller performing
   a first control for writing a combination of data and an address read from said first memory as storage unit data into said shared memory in accordance with a first write address, and designating said address read from said first memory as a next write address, and
   a second control for writing said first write address into said second memory, every time said first control is performed N times (where N is a natural number equal to or larger than 2), in addition to said first control;

a read controller performing
   a third control for reading storage unit data from said shared memory in accordance with a first read address, designating an address in said storage unit data as a next read address, and storing said first read address in said first memory, and
   a fourth control for executing said third control using an address read from said second memory in place of said first read address every time said third control is performed N times; and an error detector that detects an error in said first read address or said next read address and, when detecting an error, discards the erroneous address and returns said read controller to an initial state where said read controller performs said fourth control.

2. A shared memory controller according to claim 1, wherein:

said write controller comprises a first counter for counting each time data is written into said shared memory, and a first register for holding a write address;

said read controller comprises a second counter for counting each time data is read from said shared memory, and a second register for holding a read address;

when said first counter shows a value other than an initial value, said write controller performs a fifth control in place of said first control, in place of said fifth control for writing said storage unit data into said shared memory in accordance with a write address retrieved from said first register, and holding an address in said storage unit in said first register, and when said first counter shows the initial value, said write controller performs a sixth control in place of said second control, said sixth control for writing said write address into said second memory; and when said second counter shows a value other than an initial value, said read controller performs a seventh control in place of said third control, said seventh control for reading storage unit data from said shared memory in accordance with a read address retrieved from said second register, holding an address in said storage unit data in said second register, and storing the read address retrieved from said second register in said first memory, and when said second counter shows the initial value, said read controller performs an eighth control in place of said fourth control, to read unit storage data from the shared memory using an address read from said second memory in place of a read address retrieved from said second register.

* * * * *